L. F. Bancroft.

Street Sprinkler.

No. 3,917. Reissued Apr. 12, 1870.

Witnesses
Thos. H. Dodge
H. L. Fuller

Inventor
L. F. Bancroft

N. PETERS, PHOTO-LITHOGRAPHER, WASHINGTON, D. C.

United States Patent Office.

LOREY F. BANCROFT, OF WORCESTER, MASSACHUSETTS, AND ANDREW B. YETTER, OF NEW YORK, N. Y., ASSIGNEES OF L. F. BANCROFT.

*Letters Patent No.* 53,557, *dated April* 3, 1866; *reissue No.* 3,917, *dated April* 12, 1870.

IMPROVEMENT IN STREET-SPRINKLERS.

The Schedule referred to in these Letters Patent and making part of the same.

*Know all men by these presents:*

That I, LOREY F. BANCROFT, of the city and county of Worcester, State of Massachusetts, have invented certain new and useful Improvements in Street-Sprinklers; and I do hereby declare that the following is a full, clear, and exact description of the same, reference being had to the accompanying drawings forming a part of this specification, in which—

Like letters of reference designate the same parts in both figures.

Figure 1:
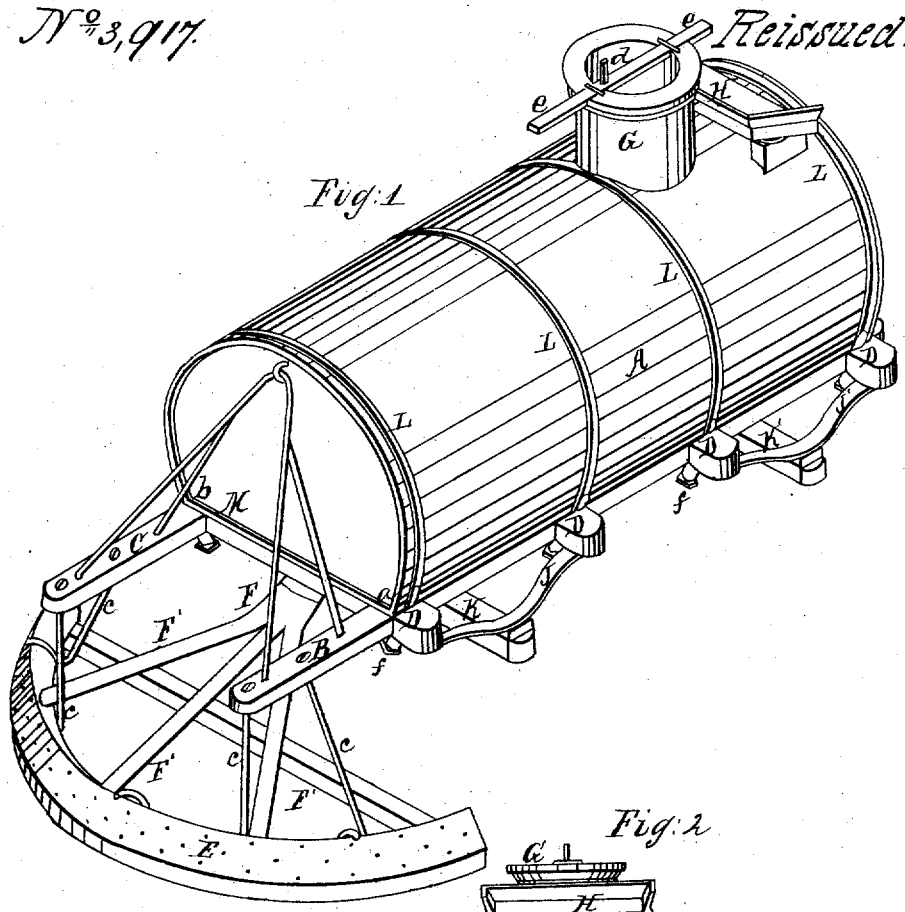
Figure 1 represents a perspective view of my improved street-sprinkler.
Figure 2:
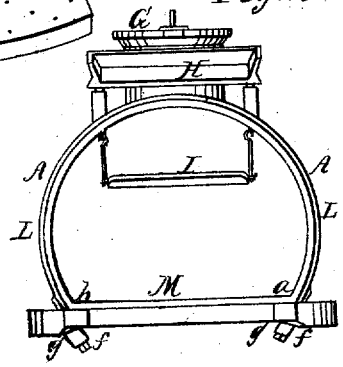
Figure 2 represents a front view.

The peculiarity of my invention consists in the construction of a cylindrical or partly-cylindrical tank, secured by adjustable clamps or bands, in combination with suitable apparatus for discharging jets of water, and mounted upon a carriage, for use in sprinkling streets.

The tank A rests upon a frame composed of the longitudinal timbers B and C and cross-timbers D D D D.

E is the sprinkling-chamber, which is supported by stay-rods *c c c c* from the projecting ends of the timbers B and C.

The water passes to the sprinkling-chamber through the branch pipes F′ F′ F′ of pipe F.

G is the turret or dome through which water may be introduced to the tank A, and which also serves to contain the valve-rod *d*, operated by the slide *e*, by means of which water is let on or shut off from the sprinkling apparatus. This dome, turret, or combing, as it may be called, may be of any convenient shape, with its vertical sides sufficiently elevated above the tank to prevent the water inside from splashing out by the motion of the carriage.

The cross-timbers extend by or project at each side, so that springs, J J′, can be applied to support the water-receptacle A, outside of the latter, as fully indicated in the drawings, thus enabling the same to be supported in a secure and easy manner.

The front set of springs, J′, one on each side of the receptacle A, rests upon the rocker-timber or piece K′, which is to be secured to the axle of the wagon or running part.

Water-sprinklers for street use, as heretofore constructed, have been very objectionable, one of the most objectionable features being a constant liability to leak, whereby the running-gear of the wagon upon which the water-receptacle is mounted soon rots and breaks, thus involving a constant expense for repairs. Again, with the box-form of water-receptacle or reservoir, the motion of the water in passing over pavements and uneven streets is so violent that the sides, ends, and top of the reservoir soon give out.

By the form and mode of construction of my water-reservoir I obtain for it great strength and durability, and prevent leakage, since, if the joints begin to loosen or open, they can all be effectually closed by tightening the nuts *f* on the clamping-bands L, which pass around the water-receptacle A, and thence through the ends of the cross-pieces D, to receive the washers *g* and nuts *f*.

The carriage or wheel part, upon which the reservoir A is mounted, can be turned quite short round, since the front wheels may be turned in under the reservoir.

The tank A is made of strips tongued and grooved, or with plain joints, and of such form that all the joints can be closed water-tight in the operation of the tightening-clamps as aforesaid.

The bed-piece K is attached to the rear axle of the wagon.

What I claim as my own invention, and desire to secure by Letters Patent, is—

1. The cylindrical or partly cylindrical tank, secured by adjustable clamps or bands, and provided with apparatus for discharging jets of water, and mounted upon a carriage for use in sprinkling streets, substantially as described.

2. The turret G upon the tank, as arranged with relation to the valve and to the sprinkling apparatus, substantially as described, and for the purposes set forth.

LOREY F. BANCROFT.

Witnesses:
CHAS. B. PRATT,
R. D. CURSONS.